US008572245B1

(12) United States Patent
Singh et al.

(10) Patent No.: US 8,572,245 B1
(45) Date of Patent: *Oct. 29, 2013

(54) USING THE TCP WINDOW SIZE FOR IDENTIFYING PACKETS AND DEBUGGING

(75) Inventors: Yogendra Singh, Cupertino, CA (US); Sreekanth Rupavatharam, San Jose, CA (US)

(73) Assignee: Juniper Networks, Inc., Sunnyvale, CA (US)

( * ) Notice: Subject to any disclaimer, the term of this patent is extended or adjusted under 35 U.S.C. 154(b) by 85 days.

This patent is subject to a terminal disclaimer.

(21) Appl. No.: 13/408,834

(22) Filed: Feb. 29, 2012

Related U.S. Application Data

(63) Continuation of application No. 11/673,226, filed on Feb. 9, 2007, now Pat. No. 8,145,746.

(51) Int. Cl.
*G06F 15/173* (2006.01)

(52) U.S. Cl.
USPC .......................................... 709/224; 709/223

(58) Field of Classification Search
USPC ....................................................... 709/224
See application file for complete search history.

(56) References Cited

U.S. PATENT DOCUMENTS

| 6,201,791 | B1 | 3/2001 | Bournas |
| 6,963,912 | B1 | 11/2005 | Schweitzer et al. |
| 6,996,100 | B1 | 2/2006 | Haartsen |
| 2003/0012140 | A1 | 1/2003 | Tazaki |
| 2004/0013112 | A1 | 1/2004 | Goldberg et al. |
| 2004/0167840 | A1 | 8/2004 | Tully et al. |

OTHER PUBLICATIONS

Nmap Network Security Scanner Man Page, Author: Fyodor, Published:Jun. 2003 http://web.archive.org/web/20030621113848/www.insecure.org/nmap/data/nmap_manpape.html, pp. 1-17.
TCP/IP Illustrated, vol. 1—The Protocols, Author: W. Richard Steven, ISBN: 0201633469, Published: Dec. 31, 1993, Publisher: Addison-Wesley Professional, pp. 223-284.
Network Sniffer and Packet Filter, Author: NSAuditor.com, Published: Nov. 24, 2006, http://web.archive.org/web/20061115023926/www.nsauditor.com/doc/html/sessions/Packet+Filter.htm, pp. 1-17.
Copending U.S. Appl. No. 11/673,226, filed Feb. 9, 2007, to Yogendra Singh et al., 25 pages.

*Primary Examiner* — Noel Beharry
(74) *Attorney, Agent, or Firm* — Harrity & Harrity, LLP

(57) ABSTRACT

A device may distribute client packets to multiple servers, transmit health check packets with a specific window size to the multiple servers, capture the client packets and the health check packets, and extract the health check packets from the captured packets. In addition, the device may capture packets, detect a connection problem, transmit a reset packet with a specific window size, and extract the reset packet from the captured packets.

20 Claims, 8 Drawing Sheets

USING THE TCP WINDOW SIZE FOR IDENTIFYING PACKETS AND DEBUGGING

RELATED APPLICATION

This application is a continuation of co-pending U.S. patent application Ser. No. 11/673,226, filed on Feb. 9, 2007, the disclosure of which is hereby incorporated by reference herein.

FIELD OF THE INVENTION

Implementations described herein are related to network packets, and in particular, pertain to methods and apparatuses for identifying specific packets from captured packets.

BACKGROUND

Many of today's servers are designed and interconnected to provide services to a large number of hosts. For example, servers may dispense, through a network, web pages, files, and/or database records to thousands of clients. To avoid periods of downtime, the servers are typically designed to circumvent problems, such as a link failure.

One technique for circumventing problems involves load balancing. In load balancing, a set of designated devices are used to relay and distribute messages from clients to many servers. By distributing the system load, the system may provide protection against individual server failures. For example, if a load balancing system distributes client requests to ten servers, when one server fails, the system may continue to operate by distributing client requests to the other nine servers.

In order to distribute client requests effectively, the load balancing system may keep track of servers that are "healthy" and that have failed. By transmitting health check packets to servers and waiting for response packets from the servers, the load balancing system may detect servers that are operational.

SUMMARY

According to one aspect, a method may include distributing client packets to multiple servers, transmitting health check packets with a specific window size to the multiple servers, capturing the client packets and the health check packets, and extracting the health check packets from the captured packets.

According to another aspect, a method may include capturing packets, detecting a connection problem, transmitting a reset packet with a specific window size, and extracting the reset packet from captured packets.

Additionally, extracting the reset packet may include filtering the reset packet based on the specific window size.

Additionally, the method may further comprise using the specific window size to map an error condition associated with the specific window size to obtain details about the connection problem.

According to yet another aspect, a device may include a network interface. In addition, the device may further include a processor to produce health check packets with a field having a predetermined value, send the health check packets to a list of servers through the network interface, record packets that are received at the device and packets that are sent from the device, and identify the health check packets from the recorded packets based on the field having the predetermined value.

According to a further aspect, a device may include a processor to record packets, detect a server with a connection problem, generate a reset packet with a field having a predetermined value, address the reset packet to the server or a client with the connection problem, and obtain the reset packet from the recorded packets based on the field having the predetermined value.

According to a further aspect, a device may include means for creating health check packets with a specific window size, means for sending the health check packets to a list of servers, means for capturing packets that are received at the device and packets that are sent from the device; and means for extracting the health check packets from the captured packets based on the specific window size.

BRIEF DESCRIPTION OF THE DRAWINGS

The accompanying drawings, which are incorporated in and constitute a part of this specification, illustrate one or more embodiments described herein and, together with the description, explain the embodiments. In the drawings.

DETAILED DESCRIPTION

The following detailed description refers to the accompanying drawings. The same reference numbers in different drawings may identify the same or similar elements.

Exemplary Embodiment

In the following implementations, a load balancer may generate health check packets and transmit them to servers, to probe whether the servers can continue to handle client requests. During the generation of the health check packets, the load balancer may set fields in the packet headers to a particular value. The value is set such that, if records of transmitted and/or received packets are scanned, the health check packets may be easily identified and inspected based on the value. Thus, any information regarding the health check packets may be easily located within the records.

In addition, the load balancer may generate reset packets when a server connection is closed or when an error condition has occurred in the load balancer or a user proxy. During the generation of a reset packet, the load balancer may set the field in the packet header to a particular value. This value can be mapped in load balancer or user proxy code to locate from which portion of the code the RST packet is generated and to discover the nature of the problem. Thus, any information regarding the reset packet may be easily located within the records.

Figure 1:
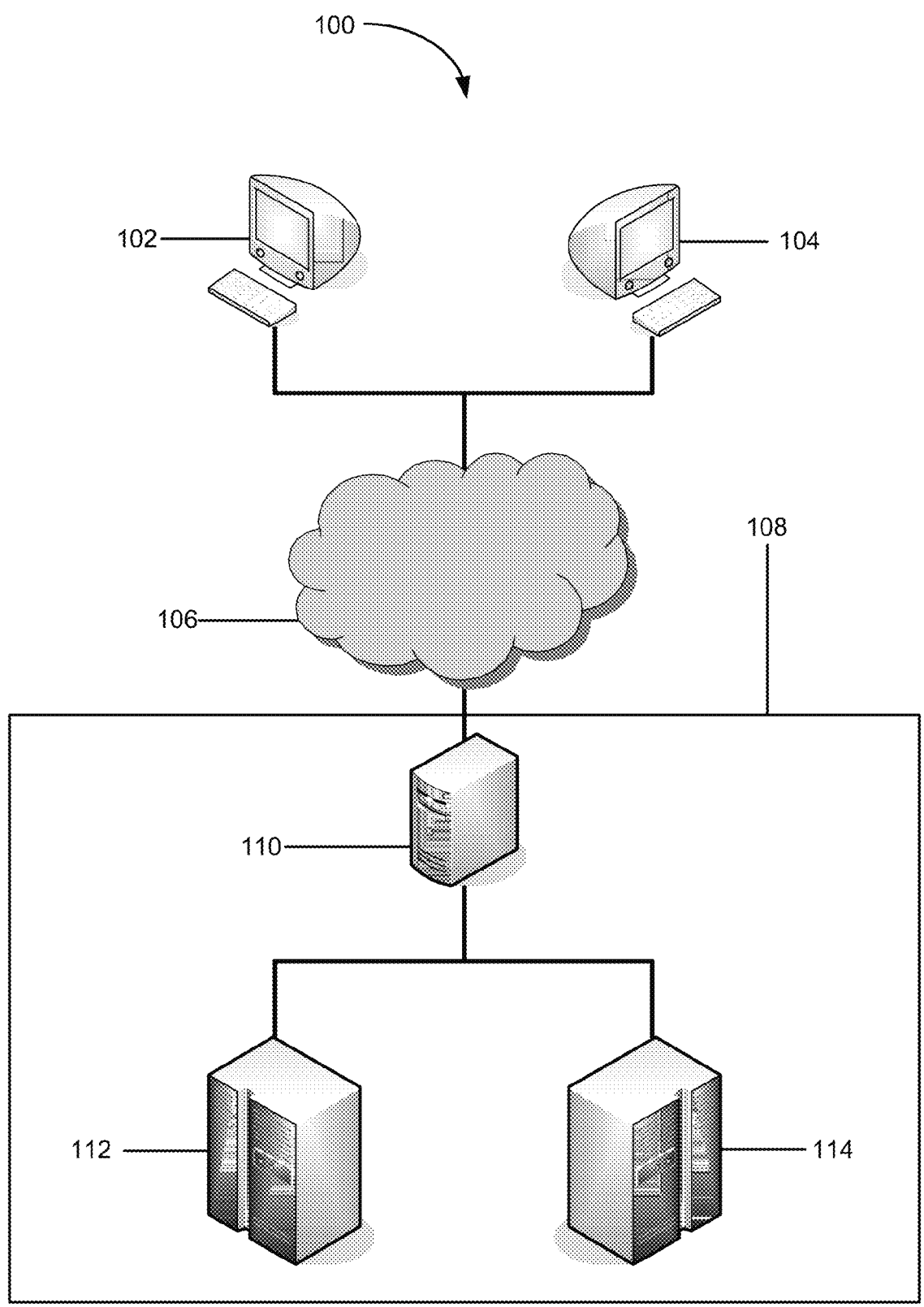
FIG. 1 shows an exemplary network in which systems and methods described herein can be implemented.

FIG. 1 shows an exemplary network 100 in which systems and methods described herein can be implemented. Network 100 may include client devices 102 and 104, network 106, and service provider 108. In practice, network 100 may include more or fewer client devices and service providers.

Client device 102 may include a personal computer; a radiotelephone; a personal communications system (PCS) terminal that may combine a cellular radiotelephone with data processing, facsimile, and data communications capabilities; a mobile telephone; an electronic notepad; a laptop; a personal digital assistant (PDA) that can include a radiotelephone, pager, Internet/intranet access, web browser, organizer, calendar, etc.; and/or one or more computer systems with sufficient computing power and memory to support functions described herein. Client device 102 may communicate through network wires, cables, or wireless transceivers with other nodes with addresses (e.g., Internet Protocol (IP) address, Uniform Resource Locator (URL)) in network 100. Client device 104 may include similar components as client device 102 and may operate similarly as client device 102.

Network 106 may include the Internet, an ad hoc network, a local area network (LAN), a wide area network (WAN), a metropolitan area network (MAN), a cellular network, a public switched telephone network (PSTN), any other network, or combinations of networks.

Service provider 108 may include one or more computer systems and networks for rendering services to clients 102 and 104. Examples of services include chat conference, web service, video conference, file transfer service, and delivery of video and audio streams.

Service provider 108 may include load balancing device 110 and server devices 112 and 114. In practice, service provider 108 may include more of fewer load balancing devices and/or server devices.

Load balancing device 108 may include one or more computer systems for receiving client service requests from client devices 102 and 104 and distributing the client service requests to server devices 112 and 114, so that each server device may bear approximately equal computational burden. Each of server devices 112 and 114 may include one or more computer systems for responding to client service requests. For instance, server device 112 may include servers, such as a web server.

Figure 2:
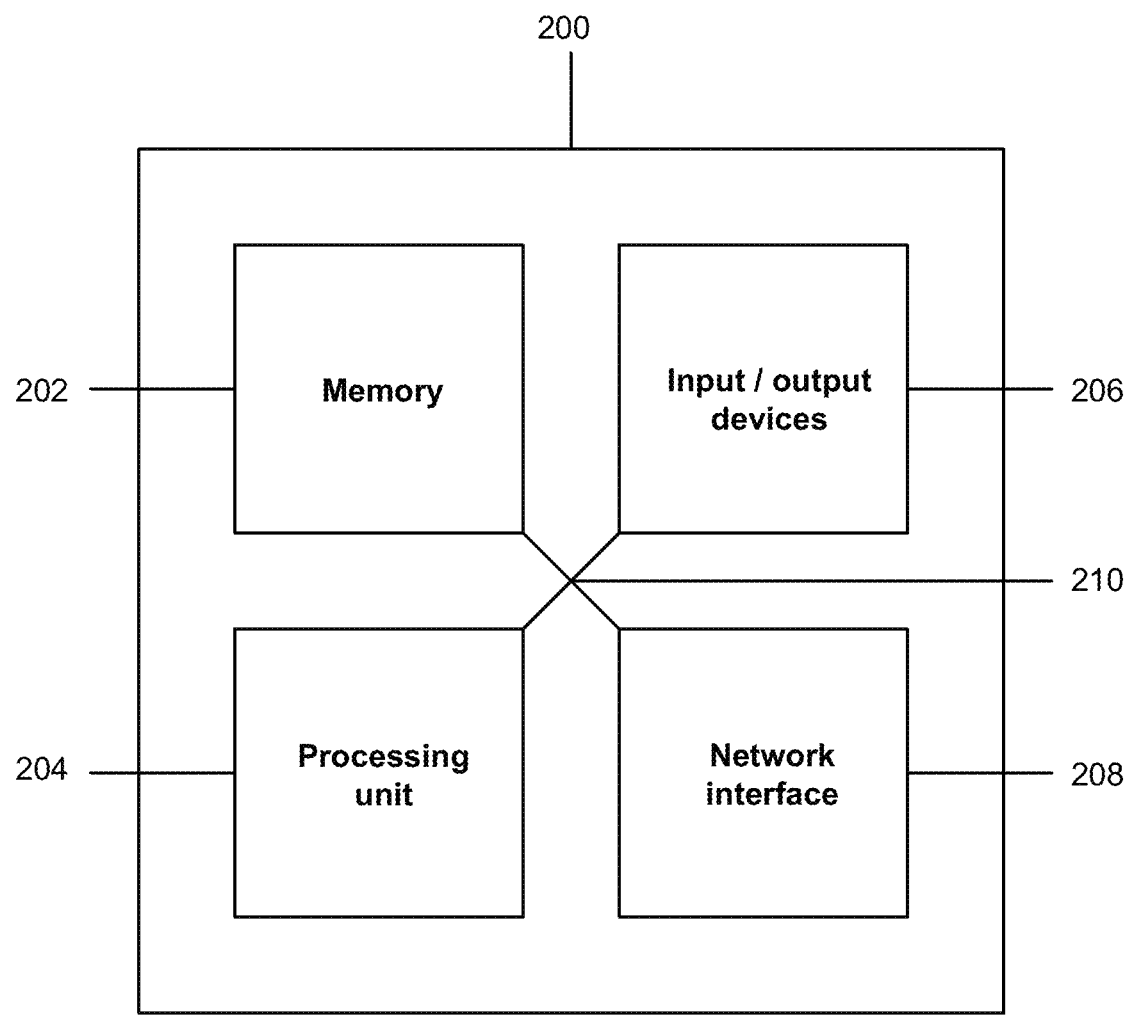
FIG. 2 is a functional block diagram of an exemplary computer system on which the client devices, the load balancing device, and the server devices of FIG. 1 may be implemented.

FIG. 2 is an exemplary functional block diagram of a computer system 200 on which the client devices 102 and 104, the load balancing device 110, and/or server devices 112 and 114 may be implemented.

Computer system 200 may include memory 202, processing unit 204, input/output devices 206, network interface 208, and communication bus 210. Memory 202 may include static memory, such as read only memory (ROM), and/or dynamic memory, such as random access memory (RAM), or onboard cache, for storing data and machine-readable instructions. Memory 202 may also include storage devices, such as a floppy disk, CD ROM, CD read/write (R/W) disc, and/or flash memory, as well as other types of storage devices.

Processing unit 204 may include one or more processors, microprocessors, and/or processing logic capable of interpreting and executing instructions. Input/output devices 206 may include a keyboard, display, console, button, mouse, speaker, microphone, digital camera, digital video camera, and/or another type of device for converting physical events or phenomena to and/or from digital signals that pertain to computer system 200.

Network interface 208 may include any transceiver-like mechanism that enables computer system 200 to communicate with other devices and/or systems. For example, network interface 208 may include mechanisms for communicating via a network, such as network 106. Additionally or alternatively, network interface 208 may include a modem, an Ethernet interface to a LAN, and/or an interface/connection for connecting computer system 200 to other devices.

Communication bus 218 may provide an interface through which components of device 200 can communicate with one another.

Client devices 102 and 104, load balancing device 110, and server devices 112 and 114 may each include different types of memory 202, processing unit 204, input/output devices 206, network interface 208, and communication bus 210, depending on a device specific role. For example, client device 102 may include network interface 208 that handles wireless communication; load balancer 110 may include network interface 208 that handles fast distribution of client messages; and/or server 112 may include network interface 208 that can handle a large bandwidth.

Figure 3:
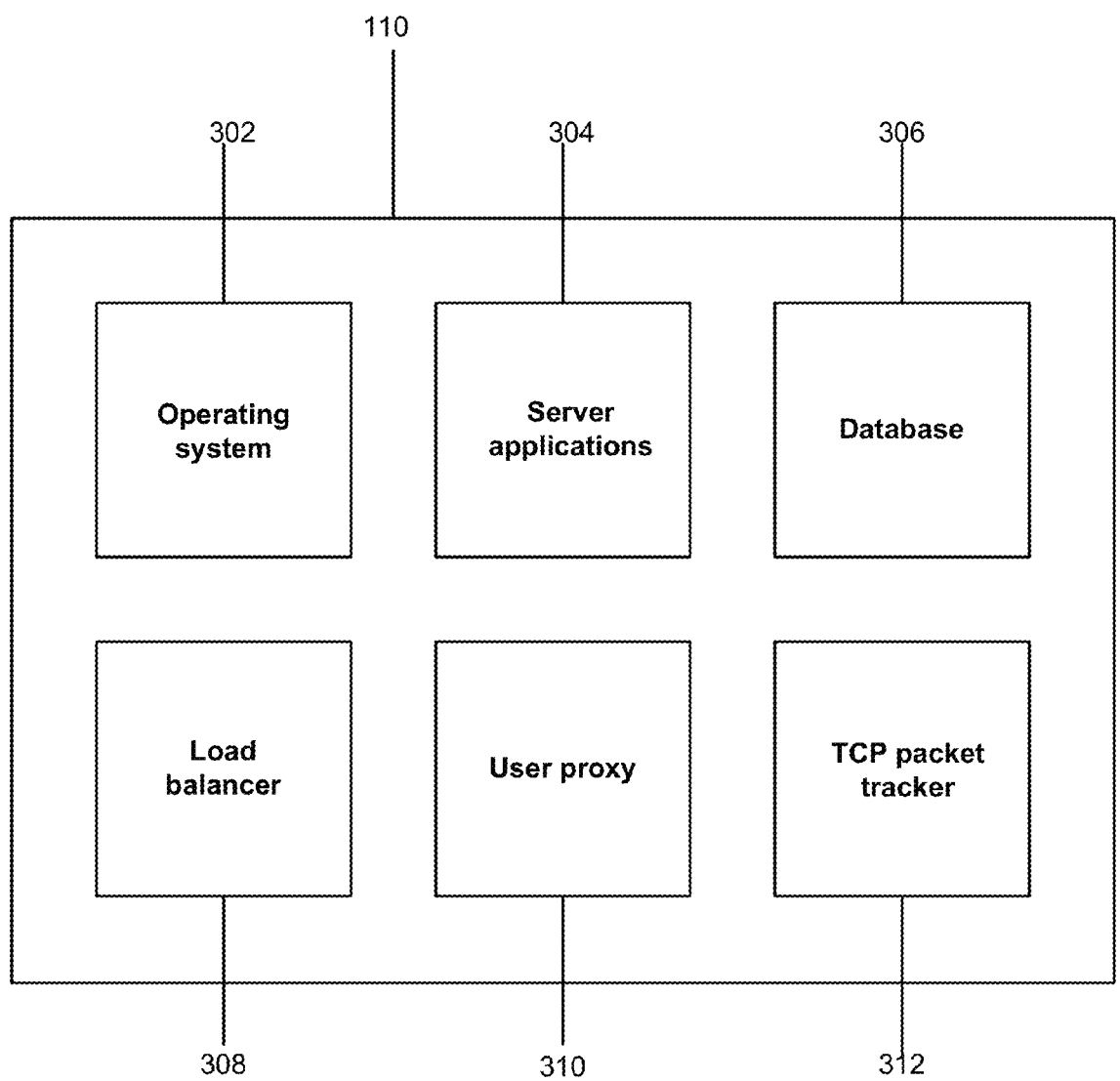
FIG. 3 is a functional block diagram of the components in the exemplary load balancing device of FIG. 1.

FIG. 3 is an exemplary functional block diagram of the components in load balancing device 110 of FIG. 1. Load balancing device 110 may host an operating system 302, server applications 304, a database 306, a load balancer 308, a user proxy 310, and/or a Transmission Control Protocol (TCP) packet tracker 312. Load balancing device 110 may include other components (not shown) that aid in receiving, processing, and/or transmitting data.

Operating system 302 may include a computer program for managing hardware and software resources of load balancing device 110. Server applications 304 may include software programs for handling administrative tasks. For example, server applications 304 may include a text editing program, a telnet program, a user interface for configuring load balancer 308, user proxy 310, etc.

Database 306 may include records and files and may act as an information repository for load balancer 308, user proxy 310, and/or TCP packet tracker 312. For example, TCP packet tracker 312 may produce information about packets and may place the information in database 306. Also, user proxy 310 may, for example, convert content that is retrieved from server device 112 and temporarily cache the converted content in database 306.

Load balancer 308 may include software and/or hardware for receiving service requests from client devices 102 and 104 and distributing the service requests to server devices 112 and 114 through network interface 208. User proxy 310, like load balancer 308, may include software and/or hardware for receiving service requests from client devices 102 and 104 and distributing the service requests to server devices 112 and 114 through network interface 208. In addition, user proxy 310 may perform other tasks, such as data compression, sending client keep-alive, consolidated logging, content translation, switching, and application caching.

TCP packet tracker 312 may include hardware and/or software for analyzing TCP packets. TCP packet tracker 312 may intercept TCP packets that are transmitted from and/or received at load balancing device 110. In addition, TCP packet tracker 312 may record, display, and provide information about the intercepted packets.

Because load balancing device 110 may include one or more computer systems 200, the components (i.e., operating system 302, server applications 304, database 306, load balancer 308, user proxy 310, and TCP packet tracker 312) may be distributed over many nodes in a local or distributed network. In addition, there may be more than one of any of the components.

Figure 4:
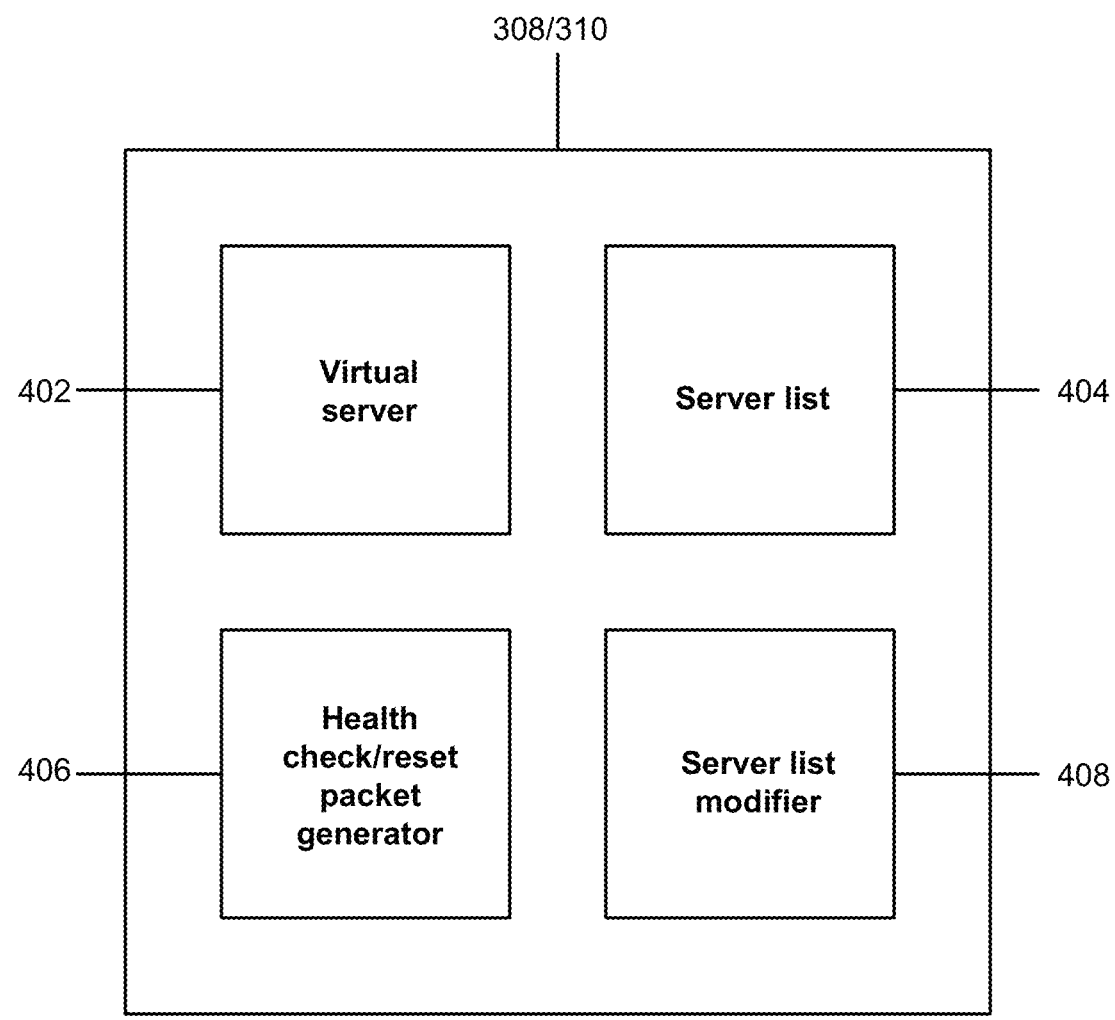
FIG. 4 is a functional block diagram of components in the exemplary load balancer and the user proxy of FIG. 3.

FIG. 4 is an exemplary functional block diagram of components in the load balancer 308 of FIG. 3. While the following description is provided with reference to load balancer 308, they also apply to user proxy 310. Furthermore, load balancer 308 and/or user proxy 310 may include components other than those illustrated in FIG. 4.

Load balancer 308 may include virtual server 402, server list 404, health check/reset packet generator 406, and server list modifier 408. While, in FIG. 4, virtual sever 402, server list 404, health check/reset packet generator 406, and server list modifier 408 are illustrated as separate components, in another implementation, it is possible for virtual server 402 to incorporate server list 404, health check/reset packet generator 406, and/or server list modifier 408. In addition, load balancer 308 may include more than one of each of the components (i.e., virtual server 402, server list 404, health check/reset packet generator 406, and server list modifier 408).

Virtual server 402 may include hardware and/or software for directing packets that have been received by load balancer 308 to servers in service provider 108. In addition, virtual server 402 may be associated with a network address (not shown) and a port number (not shown). The network address and port number may identify, on network 106, the logical address of virtual server 402, to and from which packets may be sent.

Server list 404 may include a list of servers to which virtual server 402 may direct packets. Server list 404 may provide, for each server in its list, a network address and a port number. In one implementation, server list 404 may include all servers within service provider 108 that are dedicated to a particular service. In addition, server list 404 may indicate whether each server is operational and/or whether it is bound to virtual server 402.

Health check/reset packet generator 406 may include software and/or hardware for generating health check packets to probe the health of servers in server list 404 and for generating reset packets that are addressed to servers and to clients.

In addition, health check/reset packet generator 406 may also include software and/or hardware for setting values of particular fields in health check and reset packets, so that when health check/reset packets are captured by load balancing device 110 along with other packets, they may be identified based on the field values. The fields are explained in later descriptions of an exemplary health check/reset packet.

Server list modifier 408 may include software and/or hardware for modifying the health status of servers in server list 404 based on health check packets that have been generated by health check/reset packet generator 406. For example, if a server does not return one or more responses to a received health check packet within a predefined time, the server may be considered down. Server list modifier 408 may modify server list 404 to reflect the down status of the server.

Exemplary Health Check/Reset Packet

Figure 5:
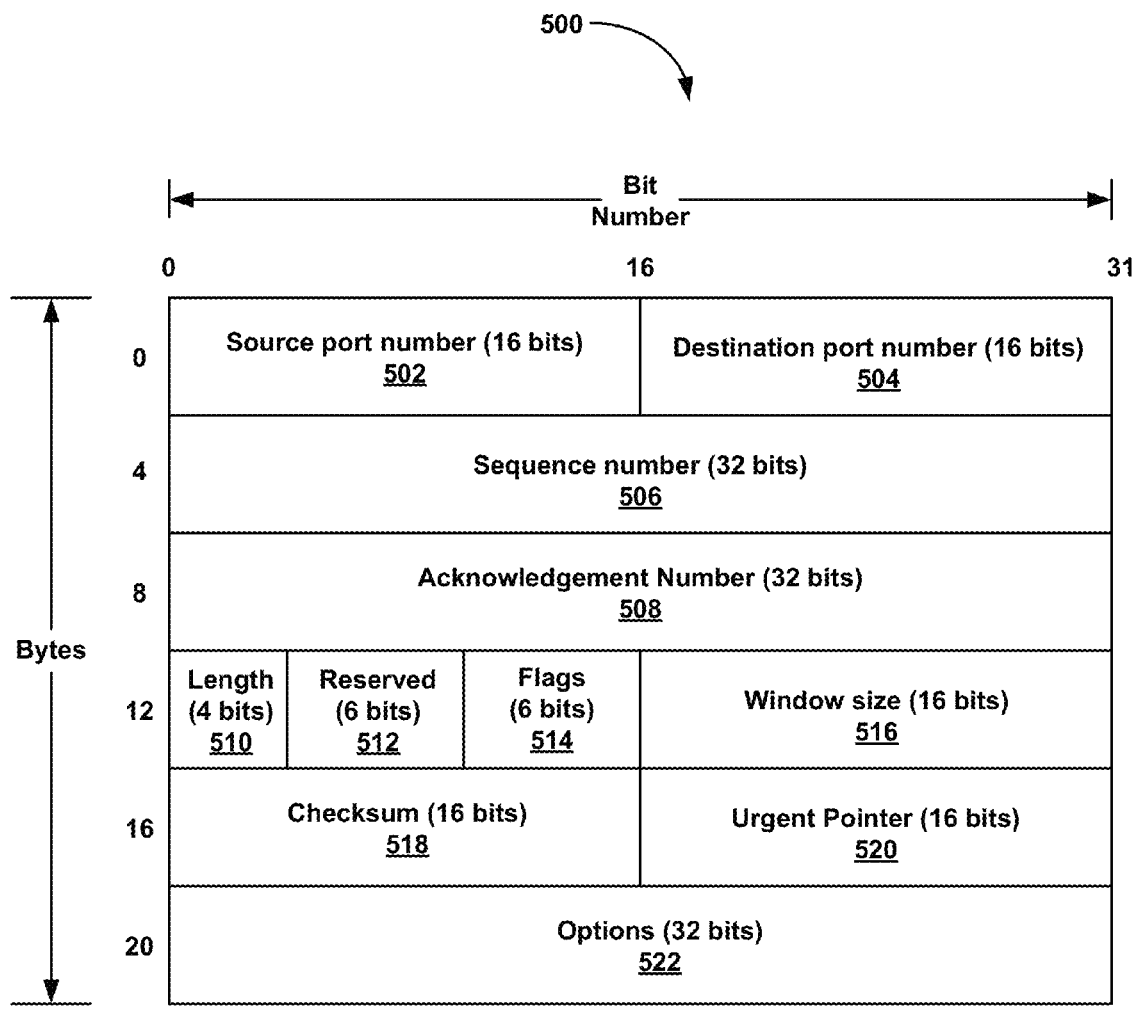
FIG. 5 illustrates the format of a Transmission Control Protocol (TCP) packet included in an exemplary health check/reset packet.

FIG. 5 illustrates the format of an exemplary health check/reset packet. The health check/reset packet may include a TCP packet header 500, which, in turn, may include the following fields: source port field 502, destination port field 504, sequence number field 506, acknowledgement number field 508, header length field 510, reserved field 512, flags field 514, window size field 516, TCP checksum field 518, urgent pointer field 520 and options field 522.

Source port field 502 and destination port field 504 may identify applications at two communication end points. Sequence number field 506 may hold the sequence number of packets that are exchanged between the end points. Acknowledgment number field 508 may contain the next sequence number that is expected by an initial packet sender from the reply packet. Header length field 510 may hold the size of TCP header 500 in units of 32-bit words. The role of reserved field 512 is not yet specified by TCP and may contain one or more zeros.

Figure 6:
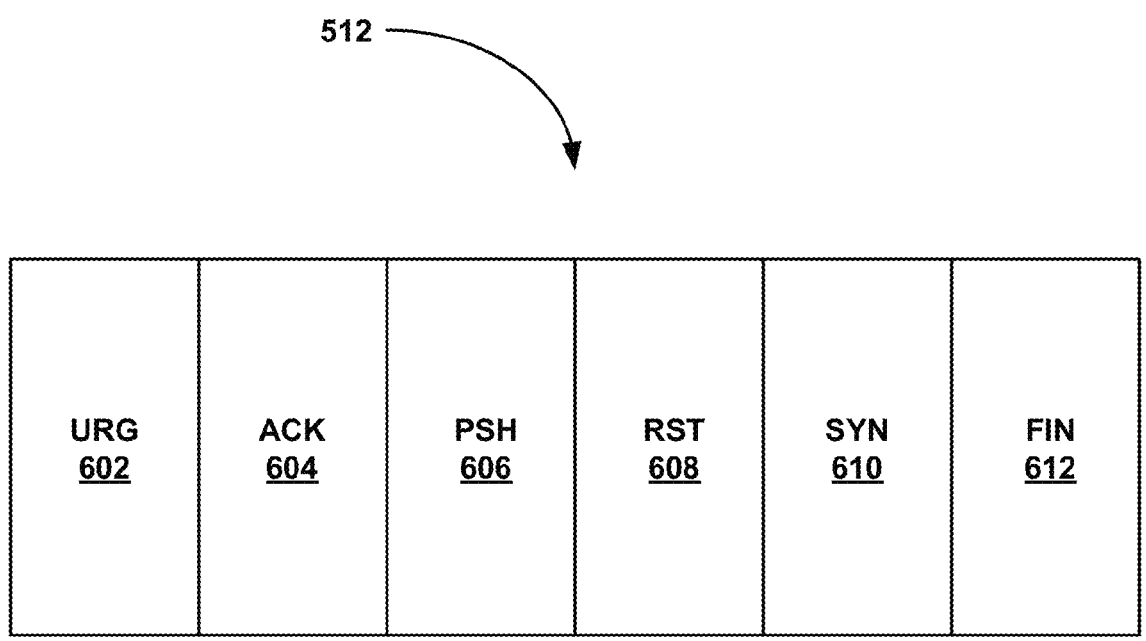
FIG. 6 is a diagram of six flags within the flags field of FIG. 5.

Flags field 514, which is also known as control bits, may indicate the status of a packet and may be used in interpreting the packet. FIG. 6 is a diagram of the six flags within flags field 514. Flags field 514 may include URG flag 602, ACK flag 604, PSH flag 606, RST flag 608, SYN flag 610, and FIN flag 612. A particular flag that is "set" herein refers to the placement of one or zero bit value into the flag to indicate a particular packet condition.

URG flag 602, when set, may indicate that the value in urgent pointer field 520, to be described shortly, is valid. ACK flag 604, when set, may indicate that acknowledgement number field 508 is valid. PSH flag 606, when set, may indicate that the packet requests a push (i.e., pass data to an application as soon as possible). RST flag 608, when set, may indicate that a connection should be reset. SYN flag 510, when set, may indicate an initial sequence number by which packets between two communication end points can be synchronized. FIN flag 512, when set, may indicate that a sender has finished sending data.

In a health check packet, the SYN flag may be set and, in a reset packet, the RST flag may be set.

Returning to FIG. 5, window size field 516 in a packet that carries a payload may hold a parameter that relates the outstanding bytes that a sender can transmit on a particular connection before the sender receives an acknowledgement from the receiver. However, a health check/reset packet does not carry a payload, and therefore, in a health check/reset packet, window size field 516 may be used to convey other information.

In an exemplary implementation, within a health check packet, window size field 516 may contain a number that distinguishes the health check packet from other types of packets; and within a reset packet, window size field 516 may contain a number that relates the reason for closing a connection associated with the packet. In addition, the number may distinguish the reset packet from other types of packets.

Checksum 518 field may be used for error-checking the packet. Urgent pointer field 520 may identify data that the receiving end may process immediately. Options field 522 may include information for flow control and data size.

Exemplary Processes for Using the TCP Window Size

Figure 7:
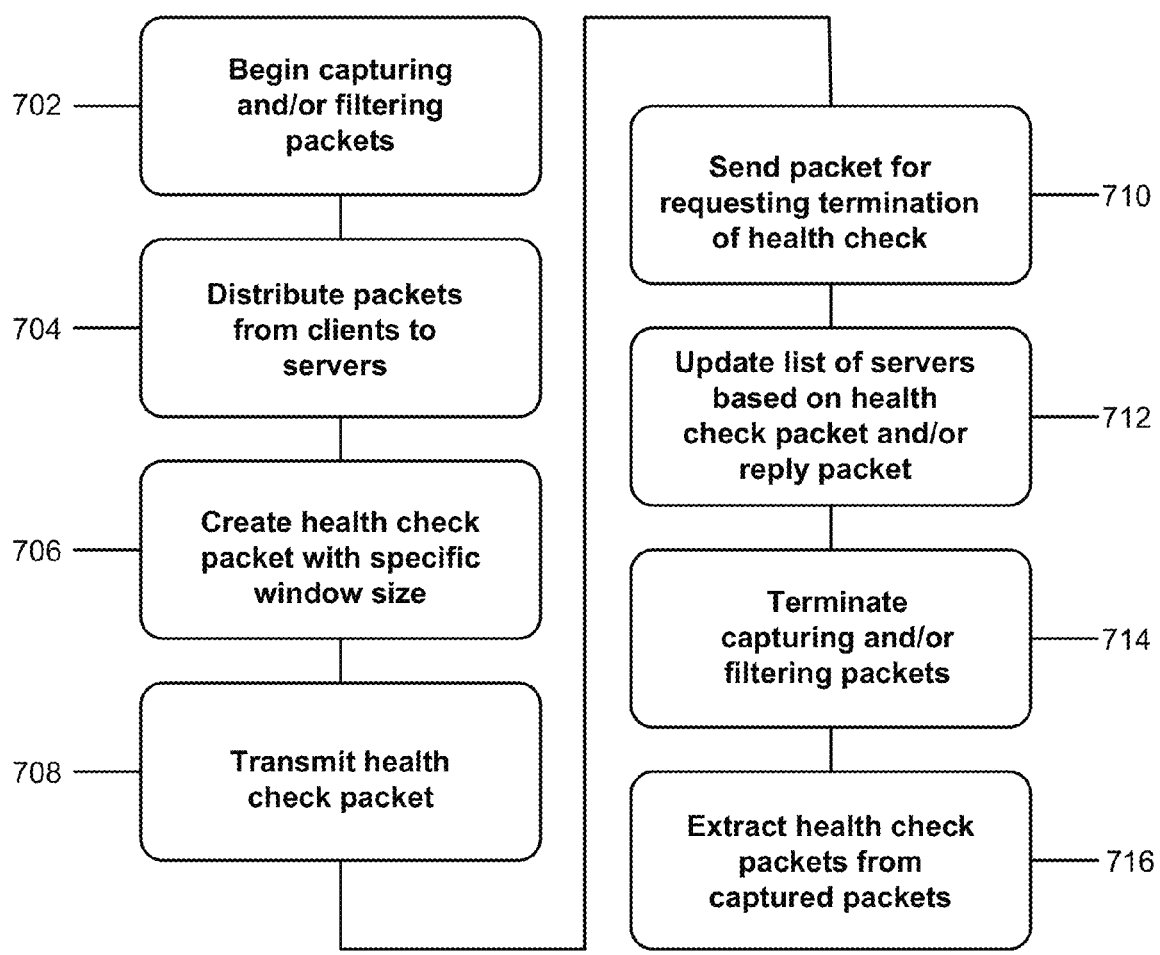
FIG. 7 shows an exemplary process for using a TCP window size for identifying packets.

FIG. 7 shows an exemplary process for using the TCP window size for identifying packets. At block 702, packets may begin to be captured or filtered by TCP packet tracker 312. The term "capture," as used herein, may refer to recording parameters associated with a packet. Capturing a packet may not interfere with its routing. The filtering may or may not be performed while the packets are being captured, based on the specific value of window size, to remove all packets other than health check packets.

At block 704, for a given service, packets from clients may be distributed to servers. The packet distribution may balance the server loads. At block 706, at a predetermined time, a health check packet with its window size field 516 set to a specific value, such as 60,000, may be created. As described previously, SYN flag 610 of the health check packet may also be set.

At block 708, the health check packet may be transmitted to a server. When the server receives a health check packet, if the server is operational, the server may process the packet, may allocate necessary resources for establishing a connection with the health check packet sender as the result of examining SYN flag 610, and may send a reply packet within a predetermined span of time. Further exchanges may take place between the server and the health check packet sender to complete the connection. If the server is not operational or is malfunctioning, the server may fail to respond to the health check packet within the predetermined span of time.

At block 710, a packet for requesting the termination of a health check, referred to as a FIN packet hereinafter, may be sent to each server that has responded to a health check packet and has sent a reply packet. The FIN flag of the FIN packet may be set, so that when a server receives the FIN packet, the server may recognize that it may deallocate previously allocated resources for establishing the connection. Further exchanges may take place between the server and the health check packet sender to close the connection.

At block 712, the list of servers in server list 404 may be updated based on health check packets and/or reply packets. A server that has responded to a health check packet and has a sent a reply packet may be deemed healthy and the list may be modified to reflect its healthy status. A server that fails to respond to a health check packet within a predetermined time may be deemed unhealthy or down. If the server is found to be unhealthy, the list may be modified to reflect the down status of the server.

At block 714, capturing and/or filtering packets may be terminated. The captured packets may be recorded or written to a database, such as database 306, or files. If the filtering has not been performed during the packet capture, the filtering may be applied to extract health check packets from the captured packets (block 716). The health check packets may be quickly identified based on the specific value stored in window size field 516.

The captured packets and the health check packets may be further examined to discover communication, server, and system problems.

Figure 8:
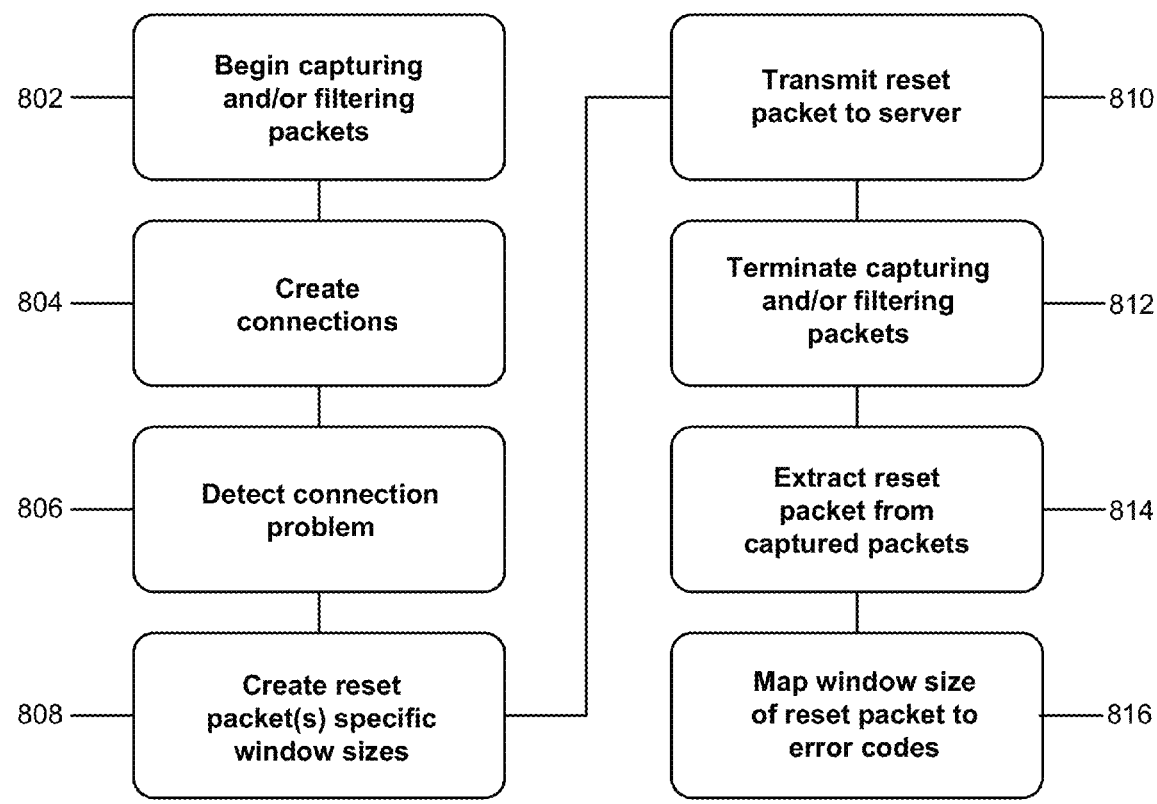
FIG. 8 shows an exemplary process for using the TCP window size for debugging.

FIG. 8 shows an exemplary process for using the TCP window size for debugging. At block 802, packets may begin to be captured and/or filtered by TCP packet tracker 312. The filtering may or may not be performed while the packets are being captured, based on the specific value of window size 516. At block 804, connections may be created between load balancer 308 and servers and between load balancer 308 and clients.

At block 806, a problem with a connection may be detected. There may be many reasons for the problem and may be many ways in which they are detected. For example, the server may fail due to a memory fault. In other instances, the server may fail to respond to client data transmissions. When the server fails, it is possible for the server to transmit a request to terminate an existing connection as well as a reason for the request.

At block 808, a reset packet with a specific window size may be created. The window size of the packet may be set to distinguish the packet from other packets, as well as to encode a particular reason why the reset packet is being transmitted. For example, if a connection is being closed because of an idle time out, the window size may be set to 20,002 (or another predetermined value) to indicate the idle time out. At block 810, the reset packet may be transmitted to the server. If a client is connected to the server through load balancer 308, the reset packet may be also transmitted to the client.

At block 812, capturing and/or filtering packets may be terminated. If the filtering has not been performed during the packet capture, the filtering may be applied to extract reset packets after they have been captured (block 814).

At block 816, the window size of the reset packets may be mapped to error codes. For instance, if a window size of 40,001 (or another predetermined value) indicates that load balancer 308 or user proxy 310 has reported a memory problem, filtering for reset packets with the window size of 40,001 may facilitate analysis of the memory problem.

Alternative Implementations

Many changes to the processes for using the TCP window size described above may be implemented. For example, in one implementation, options field 522 (or another field) may be used instead of window size field 516 to distinguish health packets and reset packets from each other and from regular packets.

During the generation of health check packets, load balancer 308 may set options field 522 in the packet headers to a particular value. The value is set such that, if records of transmitted and/or received packets are scanned for fault detection and/or system optimization, the health check packets may be easily identified and inspected based on the set value.

In addition, load balancer 308 may generate reset packets when a server reports a problem with a connection or when it detects an internal problem. During the generation of a reset packet, load balancer 308 may set options field 522 in the packet header to a particular value. The value is set such that, if records of transmitted and/or received packets are scanned for fault detection and/or system optimization, the reset packets may be easily identified and inspected.

If options field 522 is used instead of window size field 512, both length field 510 and checksum field 518 may also need to be modified, to reflect the changes in the header length and its checksum.

In another implementation, it is possible to use both window size field 516 and options field 522 to identify the health check/reset packets from other captured packets and/or to encode error messages.

Example

The following example illustrates processes involved in using the TCP window size for identifying packets in accordance with implementations described with reference to FIGS. 1-7.

Assume that clients at devices 102 and 104 are exchanging packets with server devices 112 and 114 through load balancing device 110 and that packets are being captured by TCP packet tracker 312.

In the example, virtual server 402 in load balancer 308 generates two health check packets, whose SYN flags are set. Window size field 516 of both health check packets may be set to 60,000, which identifies the packets as health check packets. Virtual server 402 may transmit one health check packet to server device 112 and the other health packet to server device 114.

When server device 112 receives the health check packet, a server on server device 112 may process the packet, allocate necessary resources for establishing a connection with virtual server 402, and dispatch a reply packet to virtual server 402. Virtual server 402 and the server on server device 112 may exchange additional packets to create a complete connection. Once the connection is in place, virtual server 402 may transmit a FIN packet to close the connection. Virtual server 402 and the server on server device 112 may exchange additional packets to complete the closing.

Similar processing may be performed between virtual server 402 and server device 114. Assume, however, that a server on server device 114 fails to respond to the health check packet due to temporary, excessive paging memory.

When virtual server 402 receives the reply packet from server device 112, server list modifier 408 may check server list 404. Assuming that the server on server device 112 is listed as being healthy, server list 404 may be left unmodified.

Virtual server 402 may also wait for a reply from server device 114 for a predetermined duration of time. When the time expires, server list modifier 408 may check server list 404. Assuming that the server on server device 114 is listed as being healthy, server list 404 may be modified to reflect the server's unavailability (e.g., down, congested).

At some point in time, TCP packet tracker 312 may cease to capture packets. Records of the captured packets contain information that includes packet window size 516 and thus, may be scanned to isolate the two health check packets for examination.

CONCLUSION

The foregoing description of embodiments provides illustration, but is not intended to be exhaustive or to limit the embodiments to the precise form disclosed. Modifications and variations are possible in light of the above teachings or may be acquired from practice of the teachings.

For example, while series of blocks have been described with regard to processes illustrated in FIGS. 7 and 8, the order of the blocks may be modified in other implementations. For example, block 702/802 may be performed after block 706/808. In addition, non-dependent blocks, such as block 712, may represent acts that can be performed in parallel to blocks 704-710. Further, certain blocks, such as block 716/814, may be omitted in some implementations.

It will be apparent that aspects described herein may be implemented in many different forms of software, firmware, and hardware in the implementations illustrated in the figures. The actual software code or specialized control hardware used to implement aspects does not limit the invention. Thus, the operation and behavior of the aspects were described without reference to the specific software code. It is understood that software and control hardware can be designed to implement the aspects based on the description herein.

No element, act, or instruction used in the present application should be construed as critical or essential to the invention unless explicitly described as such. Also, as used herein, the article "a" is intended to include one or more items. Where only one item is intended, the term "one" or similar language is used. Further, the phrase "based on" is intended to mean "based, at least in part, on" unless explicitly stated otherwise.

Further, certain portions of the invention have been described as "logic" that performs one or more functions. This logic may include hardware, such as a processor, an application specific integrated circuit, or a field programmable gate array, software, or a combination of hardware and software.

What is claimed is:

1. A method comprising:
    transmitting, by a device to a network device, a packet, a window size field of the packet including a particular value;
    storing, by the device, information relating to a plurality of packets that are:
    transmitted by the device, or
    received by the device,
    the stored information including information, relating to the packet, that includes the particular value;
    filtering, by the device and based on the particular value, the stored information to remove, from the stored information, information associated with each of the plurality of packets that does not include the particular value; and
    determining, by the device and based on the particular value included in the filtered information, whether the network device is experiencing a failure.

2. The method of claim 1, further comprising:
    determining that the network device is experiencing the failure when a response to the packet is not received, from the network device, within a particular amount of time.

3. The method of claim 2, further comprising:
    storing, prior to transmitting the packet, information identifying the network device; and
    updating the information identifying the network device to indicate that the network device is experiencing the failure when the response to the packet is not received within the particular amount of time.

4. The method of claim 1, where the network device corresponds to a first network device and the particular value corresponds to a first particular value,
    the method further comprising:
    determining that a second network device is experiencing a failure; and
    transmitting another packet to the second network device based on determining that the second network device is experiencing the failure,
    a window size field of the other packet including a second particular value.

5. The method of claim 4, where the stored information includes information relating to the other packet, the information relating to the other packet including the second particular value,
    the method further comprising:
    determining, based on the second particular value included in the stored information, a type of the failure associated with the second network device.

6. The method of claim 5, where determining the type of the failure associated with the second network device includes:
    comparing the second particular value to a plurality of error codes associated with a plurality of types of failures.

7. The method of claim 4, where transmitting the other packet includes:
    transmitting the other packet to reset a connection associated with the second network device.

8. A device comprising:
    a processor to:
    transmit a packet to a network device,
    a particular field of the packet including a particular value;
    store information relating to a plurality of packets that are:
    transmitted by the device, or
    received by the device,
    the stored information including information, relating to the packet, that includes the particular value;
    filter, based on the particular value, the stored information to remove, from the stored information, information associated with each of the plurality of packets that does not include the particular value; and determine, based on the particular value included in the filtered information, whether the network device is operational.

9. The device of claim 8, where the particular field includes a window size field or an options field.

10. The device of claim 8, where the processor is further to:
determine that the network device is not operational when a response to the packet is not received, from the network device, within a particular amount of time.

11. The device of claim 8, where the network device corresponds to a first network device and the particular value corresponds to a first particular value, and
where the processor is further to:
determine that a second network device is experiencing a failure, and
transmit another packet to the second network device, a field of the other packet including a second particular value.

12. The device of claim 11, where the other packet is transmitted to reset a connection associated with the second network device.

13. The device of claim 11, where the second particular value is based on a type of the failure associated with the second network device.

14. The device of claim 11, where the stored information includes information relating to the other packet, the information relating to the other packet including the second particular value, and
where the processor is further to:
compare the second particular value, included in the stored information, to information identifying a plurality of types of failures, and
determine a type of the failure associated with the second network device based on comparing the second particular value to the information identifying the plurality of types of failures.

15. A non-transitory computer readable medium storing instructions, the instructions comprising:
a plurality of instructions which, when executed by a processor, cause the processor to:
transmit a packet to a network device,
a particular field of the packet including a particular value;
store information relating to a plurality of packets that are:
transmitted by the device, or
received by the device,
the stored information including information, relating to the packet, that includes the particular value;
filter, based on the particular value, the stored information to remove, from the stored information, information associated with each of the plurality of packets that does not include the particular value; and
identify, based on the particular value included in the filtered information, a failure associated the network device.

16. The non-transitory computer readable medium of claim 15, the instructions further comprising:
one or more instructions to determine that the network device is experiencing the failure when a response to the packet is not received, from the network device, within a particular amount of time.

17. The non-transitory computer readable medium of claim 16, the instructions further comprising:
one or more instructions to store, prior to transmitting the packet, information identifying each of a plurality of network devices that include the network device; and
one or more instructions to update the information identifying the network device to indicate that the network device is experiencing the failure when the response to the packet is not received within the particular amount of time.

18. The non-transitory computer readable medium of claim 15, the instructions further comprising:
one or more instructions to determine that the network device is experiencing the failure,
the packet being transmitted based on determining that the network device is experiencing the failure.

19. The non-transitory computer readable medium of claim 18, the instructions further comprising:
one or more instructions to compare the particular value, included in the filtered information, to information identifying a plurality of types of failures; and
one or more instructions to determine a type of the failure associated with the second network device based on comparing the particular value to the information identifying the plurality of types of failures.

20. The non-transitory computer readable medium of claim 18, where the particular field includes a window size field or an options field, and
where the particular value is based on a type of the failure associated with the network device.

* * * * *